Oct. 8, 1957  O. HAUCKE  2,808,653
AUTOMOBILE HEADLIGHT TESTER
Filed Dec. 9, 1954
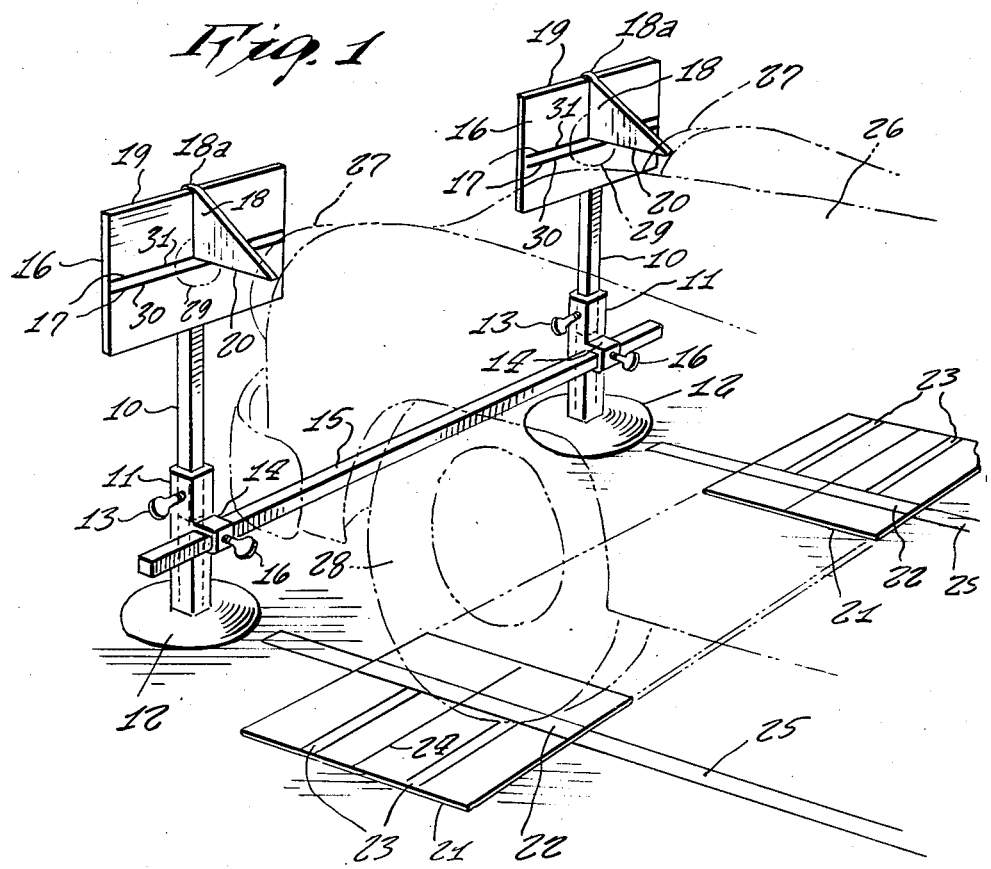
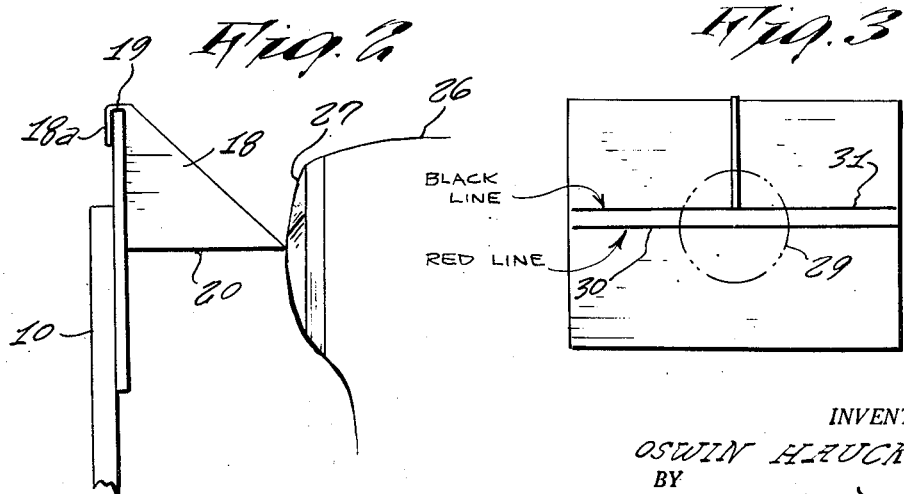
INVENTOR.
OSWIN HAUCKE
BY
Carl Miller
ATTORNEY 2,808,653

AUTOMOBILE HEADLIGHT TESTER

Oswin Haucke, Brooklyn, N. Y.

Application December 9, 1954, Serial No. 474,185

1 Claim. (Cl. 33—180)

This invention relates to an automobile headlight tester and more particularly to an automobile headlight tester used for determining whether or not the beams from automobile headlights are correctly focussed.

It is an object of this invention to provide a means for determining quickly and easily the relative alignment of the beams of automobile headlights.

Another object of this invention is to provide a means for determining whether or not the beams of automobile headlights have sufficient brightness.

Another object of the present invention is to provide a means for ascertaining whether or not the beams of automobile headlights are being used to their maximum advantage.

A further object of the present invention is to provide an automobile headlight tester which is adapted for use in garages and automobile service stations.

A still further object of the invention is to provide an automobile headlight tester of simple and durable design, which can be easily manufactured and marketed at a comparatively low price.

Other and more specific objects of the present invention will be apparent from the following description as read in connection with the accompanying drawing, the novel features of this invention being pointed out in the claim at the end of the specification.

Figure 1 is a perspective view of one form of the invention shown in operative use.

Figure 2 is a partial side view thereof.

Figure 3 is a partial front view of this form of the invention.

Referring in detail to the drawing, the embodiment of the invention therein shown comprises an improved automobile headlight tester having a pair of vertical members 10 which are adjustably secured within a pair of square vertical tubes 11 mounted upon suitable bases 12. Since the vertical members 10 have square cross-sections, no significant turning movement is allowed between the said tubes 11 and the said vertical members 10.

Suitable thumbscrews 13 are threadedly mounted in the sides of the tubes 11 and are contactable with the vertical members 10 contained therein so as to allow them to be releasably secured in any desired vertical position. On the rear sides of the said vertical tubes 11 there are also incorporated a pair of U-shaped members 14 integral with the said tubes 11 and retaining a horizontal connecting member 15 having a square cross-sectional conformation adapted to being received within the said U-shaped members 14. A pair of horizontal thumbscrews 16 are also threadedly mounted within the said U-shaped members 14 and contactable with the said connecting member 15 so as to allow it to be releasably secured in any desired horizontal position.

At the top portions of the vertical members 10 are located a pair of rectangular screens 16 upon which are marked a plurality of horizontal colored lines 17, said lines 17 being in the vicinity of the mid-portions of the said screens 16. A pair of projecting pointers 18 are also slidably retained by loops 18a integral therewith and located upon the top surfaces 19 of the screens 16. These pointers 18 have the conformations of right triangles and are disposed so that the lower edges 20 of the said triangles extend horizontally from the said screens 16.

A pair of rectangular plates 21 are used in conjunction with the above described device. Each of these plates 21 is marked with a relatively wide stripe 22, which is parallel to one edge of the said plate 21, and has two relatively narrow stripes 23 at right angles to the said wide stripe 22 and spaced equidistantly from a thin line 24 which bisects the said plate 21, the said narrow stripes 23 extending from the said wide stripe 22 to one edge of the said plate 21.

To use this form of the invention, it is first necessary to align the rectangular plates 21 so that they are parallel and have a common longitudinal alignment, as shown in Figure 1. The wide stripes 22 must also be aligned with a pair of parallel stripes 25 located upon the surface on which the plates 21 are resting. Then an automobile 26 having a pair of headlights 27 which are to be tested is driven along the parallel stripes 25 until it reaches the bisecting line 24 of the said plates 21 and its front wheels 28 are each centrally located thereon. In this position, the vertical members 10 are adjusted and the pointers 18 are moved so that their lower edges 20 are in line with the midpoints of the headlights 27, the horizontal connecting member 15 also being suitably adjusted to allow this disposition. The car is then moved backwards away from the tester approximately 30 inches, and the bright headlights are turned on. This accomplished, the center of the light beams should be in the center of a red circle 29 on each screen 16, said red circles 29 being centered on horizontal red lines 30 located on the said screens 16. The centers of the light beams should also be slightly below the pointers 18, the lower portions of said pointers 18 being on a level with horizontal black lines 31 located slightly above the said red lines 30.

It is to be noted that the center of the left light beam can be ⅛ inch to the right of the center of the red circle 29, thus reducing the glare imposed on passing vehicles.

Any other position of the central portions of the said beams will indicate a defective focus; and a disparity between their relative positions on the two screens 16 will of course manifest a lack of alignment.

The light output or brightness of the headlight beams is also indicated on the screens 16 by their color. Thus, a correct beam will be a clear white, whereas a beam which does not have the proper light output may range in color from a bright yellow to a dark yellow.

It is to be noted that the color of the background of each screen 16 is that of a metallic or other suitable color producing a white image of a light beam.

These tests may be carried out quickly and easily, and require no special skills on the part of the user. If the headlights 27 are found to be defective, they may be adjusted with the testing equipment in position, the tests being repeated as desired.

The embodiments of the invention illustrated and described hereinabove have been selected for the purpose of clearly setting forth the principles involved. It will be apparent, however, that the present invention is susceptible of being modified in respect to details of construction, combination and arrangement of parts which may be resorted to without departure from the spirit and scope of the invention as claimed.

Having thus described my invention, I claim as new and desire to secure by Letters Patent of the United States:

A device for adjusting and testing the alignment, intensity, and other qualities of vehicular headlight beams comprising, in combination, a pair of transversely aligned and similar vertical members each supported upon a base, a planar screen having means for adjustably supporting said screen upon said base, a pointer extending at right angles to each said screen, vehicle wheel guide means for guiding a vehicle into a testing position, wherein the longitudinal axis of said vehicle is perpendicularly related to the plane of said transversely aligned vertical members, each said pointer comprising a right triangle having a vertical base in facing engagement with said associated screen and a horizontal leg perpendicularly intersecting said associated screen, said horizontal leg lying substantially perpendicular to the headlight of the vehicle being tested, the hypotenuse of said triangle extending upwardly toward said screen from the apex defined with said horizontal leg adapted to reflect light from said vehicle headlight beams.

References Cited in the file of this patent

UNITED STATES PATENTS

| | | |
|---|---|---|
| 1,309,429 | Stephens | July 8, 1919 |
| 1,779,404 | Kenworthy | Oct. 21, 1930 |
| 1,985,393 | Zwiercan | Dec. 25, 1934 |
| 2,167,803 | Graham et al. | Aug. 1, 1937 |
| 2,127,734 | Hill | Aug. 23, 1938 |
| 2,144,838 | Falge | Jan. 24, 1939 |
| 2,176,214 | Falge et al. | Oct. 17, 1939 |
| 2,176,215 | Falge | Oct. 17, 1939 |